United States Patent [19]

Stewart

[11] 4,264,396
[45] Apr. 28, 1981

[54] LABELLING MACHINES

[75] Inventor: Donald S. Stewart, Saxmundham, England

[73] Assignee: Monarch Marking Systems, Inc., Dayton, Ohio

[21] Appl. No.: 928,522

[22] Filed: Jul. 27, 1978

[30] Foreign Application Priority Data

Jul. 28, 1977 [GB] United Kingdom .............. 31812/77

[51] Int. Cl.³ ...................... B65H 25/00; B32B 31/00; B41J 3/00; B41F 1/08
[52] U.S. Cl. .................................... 156/361; 156/384; 156/542; 101/93.05; 101/93.04; 101/67; 101/288; 101/291; 101/292
[58] Field of Search ............... 156/361, 362, 363, 384, 156/540, 541, 542; 101/66, 67, 93.04, 93.05, 288, 291, 292

[56] References Cited

U.S. PATENT DOCUMENTS

| 3,471,357 | 10/1969 | Bildusas | 428/40 |
|---|---|---|---|
| 3,721,601 | 3/1973 | Pituch et al. | 156/363 |
| 3,826,915 | 7/1974 | Gioletti et al. | 101/93.04 |
| 3,845,850 | 11/1974 | Herr et al. | 101/93.04 |
| 3,911,817 | 10/1975 | Becker et al. | 156/384 |
| 3,960,642 | 6/1976 | Hamisch, Jr. et al. | 156/541 |
| 3,997,384 | 12/1976 | Kuring et al. | 156/542 |
| 4,109,777 | 8/1978 | Ottenstein et al. | 101/93.05 |

FOREIGN PATENT DOCUMENTS 2253565 5/1974 Fed. Rep. of Germany .
2099351 10/1972 France .

Primary Examiner—William R. Dixon, Jr.
Attorney, Agent, or Firm—Joseph J. Grass

[57] ABSTRACT

A labelling machine has a push button switch, actuation of which causes a label to be printed by a thermographic printing head with selected data which has been stored in a microprocessor by operation of a keyboard. The printed label is fed by an electrically powered drive mechanism controlled by the microprocessor to a dispensing position from which the label can be applied to an article and a further label is advanced from a supply to the printing head. The label supply is a continuous strip of separated labels with self-adhesive covered by a backing strip which is peeled away as the printed label reaches the dispensing position. Spaced optically or magnetically detectable markings on the label strip are detected in the machine to provide signals to the microprocessor for obtaining registration of each label with the printing head.

24 Claims, 3 Drawing Figures

4,264,396

LABELLING MACHINES

BACKGROUND OF THE INVENTION

The invention relates to labelling machines of the kind used for example in supermarkets and other stores to apply to each article on display for sale an adhesive label indicating the price of the article.

Such machines comprise a receptacle for a supply of labels to be printed, a printing head, control means for selecting data to be printed by the printing head, and mechanism actuable to effect printing of a label at the printing head with the selected data and advance of the printed label to a dispensing position from which it can be dispensed for application to the article. At the same time another label is advanced from the supply to the printed head for the next operation.

In such known machines, the labels have been fed from a roll of the unprinted labels mechanically, in response to manual actuation of a lever associated with a handle of the machine, and the printing operation is effected mechanically by means of inked printing elements.

Machines of this kind have a disadvantage that the printing head requires to be filled with ink from time to time, which requires an interruption of work and involves handling, and possible spillage, of the ink; it is moreover tiring for the operator to repeatedly manually actuate both the label feeding and printing mechanism.

The invention accordingly has an object the provision of a labelling machine which is easier to employ than known machines at least in that it does not involve the use of ink.

It is a further object of the invention to provide a labelling machine which can be employed with a minimum of physical effort.

It is also an object of the invention to provide a labelling machine having extensive facilities for printing data on labels received within the machine.

It is an additional object of the invention to provide a labelling machine having means for recording information about the use thereof and for displaying and/or transmitting the information to data treatment and/or storage means.

It is moreover an object of the invention to provide a labelling machine having means for electrically or optically detecting features of a strip of labels received therein and for effecting registration of individual labels with elements of the machine in accordance with such detected features.

It is furthermore an object of the invention to provide a continuous strip of labelling material for use in a machine of the invention, and in particular such a continuous strip having spaced magnetically or optically detectable markings for detection in the machine to assist registration of labels with parts thereof.

SUMMARY OF THE INVENTION

The invention accordingly provides a labelling machine of the kind described in which the printing head is a thermographic printing head for printing labels of heat sensitive material, the machine having electric control means for controlling, and an electric power source for energising, the thermographic printing head.

According to a further feature of the invention, the control means comprise a keyboard for input of selected data into a microprocessor providing outputs for the thermographic printing head, and a switch operable as by means of a push button to effect printing of the selected data onto a label.

According to another feature of the invention, the feed mechanism can comprise rollers drivable by an electric motor, preferably a stepping motor. The motor can be powered by the same electric power source as the printing head and can be under the control of a signal derived from the microprocessor in response to operation of the switch.

In this way, the machine is made much easier to operate, as the physical input required to advance the labels is replaced by an electric drive.

According to another feature of the invention, the machine can be provided with a data register for receiving and storing information relating to use of the machine, and at least one of display means for display of the stored information and output means for transfer of the stored information to an external computer or data storage means, for use in stock control and/or accounting procedures.

According to another feature of the invention, the machine is arranged for printing and dispensing labels from a continuous strip thereof, and a sensor can be provided for optically or mechanically detecting spaced markings on the strip and supplying in response thereto signals to the microprocessor to adjust the feed mechanism to obtain registration of the printed data with the individual labels of the strip.

According to another feature of the invention, the machine can be provided with an input to the microprocessor in addition to the keyboard for input of data which is to be printed on each label together with the selected data.

In this way, part of the information can be invariable or prearranged, in not being directly under the user's control, the selected part being selected by the user to relate to the particular articles being labelled. Thus the label can be printed with the name of the store as well as the article price. The machine can also be arranged to print each label with a bar code or the like for mechanical reading if desired. The machine of the invention can be arranged to print more than one line of alphanumeric or other symbols.

The prior art labelling machine described in the introduction employ labelling material comprising a strip of sheet material having pressure sensitive adhesive on one side, and a backing strip overlying the adhesive, the strip of sheet material having equispaced transverse cuts or lines of weakness defining labels therebetween, and the backing strip being separable to permit securement of each label to an article.

According to the invention there is provided, for use in the machine of the invention, labelling material of this kind in which the strip of sheet material has on the other side thereof a dye responsive to heat to change or display colour.

According to a further feature of the invention the labelling material, for use in a machine of the invention having the optical or magnetic detecting means mentioned above, can be provided with an optically or magnetically detectable markings on the strip of sheet material or the backing strip in predetermined relation to the divisions between the labels.

The edges of the labelling machine can be notched or otherwise shaped to co-operate with the feeding mechanism of the labelling machine of the system, but the mechanical complications of such arrangements can be avoided in accordance with the invention by means of this last mentioned feature.

MACHINE STRUCTURE

Figure 1:
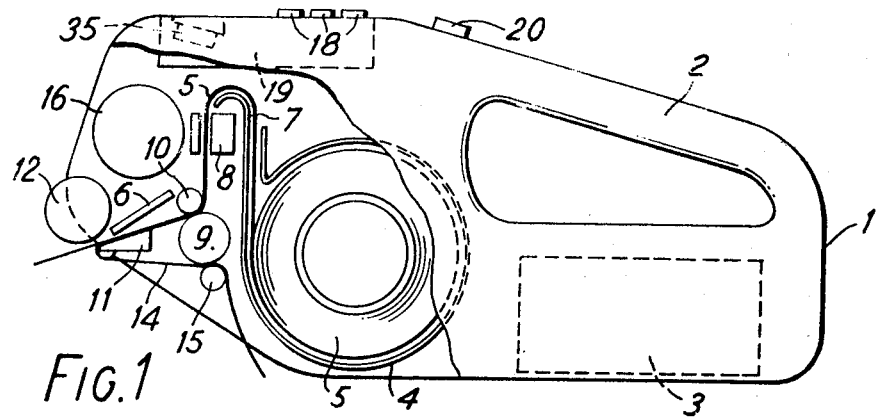
FIG. 1 is a schematic sectional side view of an illustrative labelling machine embodying the invention.

The labelling machine illustrated comprises a housing 1 shaped with an opening to provide a handle portion 2 at its upper right hand side as shown in FIG. 1. Immediately beneath the handle portion 2, the housing interior provides space for reception of an electric energy source in the form of one or more batteries 3, with door means (not shown) permitting replacement thereof. The energy source may instead be a rechargeable power pack in which event terminals are provided for recharging as by connection to the mains supply. Centrally of the housing 1, there is located a magazine 4 for labels to be printed and dispensed by the machine. In the illustrated machine, the labels are provided in a form of a rolled strip 5 of paper or other thermographic material which is led by a feed mechanism generally forwardly from the magazine to a thermographic printing head 6, and a dispensing position.

Door means (not shown) in the housing 1 permits ready replacement of the rolled label strip 5 when exhausted and convenient threading of the free end of the strip through the feed mechanism.

As appears from FIG. 1, the paper strip 5 is led upwardly from the periphery of the roll by guide means 7 and is then turned through 180° to travel past an optical sensing means 8 the nature and function of which will be described below. The paper strip is then engaged between a drive roller 9 and an idler roller 10 of the feed mechanism and emerges from the nip of these rollers to advance forwardly to between the printing head 6 and a print support 11.

Although shown as a fixed guide over which the paper strip slides, the print support 11 may include a support roller. In either event, the print support is shaped to bring the strip in engagement with heatable elements of the thermographic print head.

After printing at the printing head 6, the strip continues forwardly out of the housing 1 to beneath a dispensing roller 12, by which it can be wiped onto an article to be labelled. The paper strip is preferably self-adhesive, that is, it carries an adhesive layer on the surface opposite that which is printed, and this adhesive layer is initially covered by a backing strip 14 which must be separated from the label strip 5 itself before this can be applied to an article. For this purpose, the print support 11 is provided with a relatively sharp edge around which the backing strip 14 is turned rearwardly back into the machine to be received between the drive roller 9 and a second idler roller 15. From these rollers, the backing strip 14 is fed rearwardly and downwardly outwardly of the machine through an aperture in the housing 1.

The drive roller 9 is driven by electric motor 16, which can be a stepping motor, accommodated at the front of the housing above the dispensing roller 12. The machine operates under control of electronic circuitry, shown schematically in FIG. 2, located at the top of the housing 1 beneath a keyboard 19 provided with pushbuttons 18 by which data can be entered into the circuitry. The machine is actuated by means of a push button operated main control switch 20 positioned rearwardly of the keyboard so that it can be pressed by the thumb of an operator holding the machine with his fingers around the handle portion 2.

Instead of the feeding mechanism shown, the machine of the invention can incorporate a solenoid operated escapement drive for the label strip.

CONTROL ARRANGEMENTS

Figure 2:
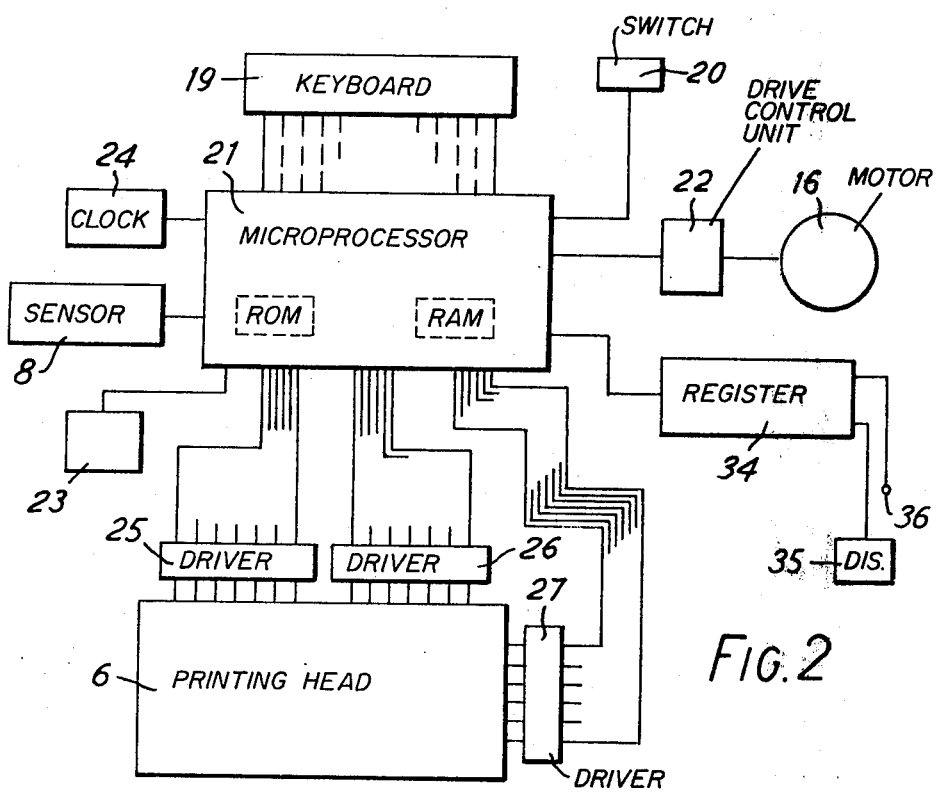
FIG. 2 shows the circuit arrangements of the labelling machine in schematic block diagram form.

The illustrated labelling machine operates under the control of the electronic circuit arrangement shown in schematic block diagram form in FIG. 2. Central to the circuit is a microprocessor 21 which is preferably a single silicon chip including within its monolithic structure a read only memory (ROM), a random access memory (RAM), instruction registers, address registers, a central control logic section, and data and input and output means. The microprocessor 21 receives inputs from the keyboard 19, the push-button switch 20, and from the sensor 8. It provides outputs to a step motor drive control unit 22 which effects operation of the step motor 16, and to the printing head 6. The circuit includes a clock 24 arranged to provide a pulse train for co-ordinating the operations carried out within the microprocessor.

PRINTING HEAD

The printing head 6 is a solid state thermographic printing head, but a hot needle or a thick or thin film thermographic printing head could be employed. The printing head 6 comprises a plate mounting a matrix or array of protruberant printing elements, together with connections to line driver circuit elements 25, 26 and dot driver element 27, connected to receive signals from the microprocessor 21. The microprocessor 21 is arranged to supply to the driver elements 25, 26 and 27 signals such that certain heating elements of the printing head, selected in dependence on a programme established by operation of the keyboard 19, receive currents sufficient to heat these elements to a temperature at which colour is developed or changed on the label strip 5 over the small area in contact with the heating elements. Typically, the printing head may carry twelve groups each comprising seven rows each of five heating elements, so that a twelve character line can be printed at the time. After a line has been printed, the stepping motor 16 of course advances the label strip by such an amount that the area of the paper on which the next line of characters is to be printed is in engagement with the printing element matrix. The printing head can comprise any appropriate number of heating elements, the numbers of connections to the head 6 shown in FIG. 2 being merely illustrative. The printing head can be arranged to print characters composed of a dot matrix in any desired combination and to print any number of characters sequentially or simultaneously in a line or column as desired.

THE LABEL STRIP

Figure 3:
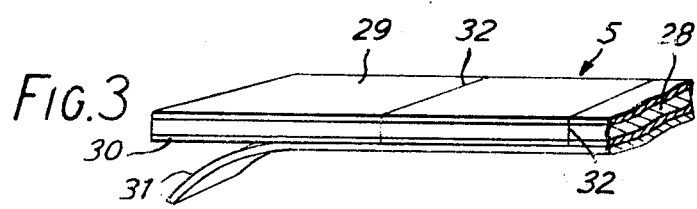
FIG. 3 is a schematic perspective view of a label strip for use in the machine in accordance with the invention.

As shown in FIG. 3, the label strip 5 comprises a length of paper or plastics material 28 having coated on one surface a suitable heat sensitive coating 29 which changes or develops colour in response to the application of the heat. The strip material 28 is coated on the opposite side with a layer 30 of adhesive material to provide a self adhesive or pressure sensitive coating. Laminated onto the adhesive layer 30 is a paper or plastics backing strip 31 coated with an adhesive resistant surface in engagement with the adhesive layer, so that the backing strip can be readily peeled away. The laminated label and backing strips are separated off into label portions all of equal length, by lines of weakness or complete or partial transverse cuts 32 made in the label strip only. During the operation by which these cuts are formed, an ink strip or other mark preferably in exact coincidence with each cut 32 is printed either on the label or on the backing strip. The ink strip is such that it can be read by the optical sensor 8 in the machine. Instead of an ink strip to be sensed optically, a magnetic strip or other mark can be provided for detection by a magnetic sensor in the machine. Either arrangement permits the sensor to provide a signal to the microprocessor so that the feed of the label strip can be adjusted to correct for any departure from registration of the printed information with the longitudinal edges of the label portions.

OPERATION

The illustrated labelling machine is primarily intended for the labelling of articles in stores and supermarkets, and the information to appear on labels dispensed by the machine comprises at a minimum the price of the article. Before printing and applying a batch of labels, the user operates the keyboard 19 to set up in the microprocessor a programme for printing the desired price information on each label of the label strip 5. The price selected is stored within the microprocessor 21, and each time the operator actuates the main push-button switch 20 a printing and dispensing cycle is performed, by which a label printed with the selected price appears below the dispensing roller, 12.

At the beginning of the cycle, the leading edge of a label portion of the strip 5 will be just beyond a narrow transverse portion of the label engaged between the heating elements of the printing head 6 and the print support 11. In response to a print command signal from the push-button switch 20, the microprocessor 21 supplies to the driver elements 25, 26 and 27 signals for energising selected heating elements in accordance with the stored printing programme determined by the user. Printing of the desired price information on the label is thus effected. The microprocessor then supplies a signal to the motor control unit 22 to energize the motor 16 to advance the strip 5 until such time as the next ink strip on the strip is detected by the sensor 8. The resultant signal to the microprocessor 21 causes this to stop energisation of the motor so that advance of the strip ceases. The positions of the sensor 8, the printing head 6, the support 11 and the roller 12 along the path of the strip 5 are such that the printed label is now beneath the roller 12 with the backing strip 31 peeled away over about 95% of the length of the label and the cut 32 separating the printed label from the next following label of the strip is at the position of the leading edge of the now printed label before the cycle began. The printed label can be applied to an article and the push button switch 20 pressed again to start another cycle.

As will be further described below, the labelling machine of the invention can be provided with many advantageous facilities beyond the capacity to print a single line of price information.

ADDITIONAL INFORMATION

Thus the labelling machine so far described can readily be adapted to print information additional to the readily adjustable price information put into the machine by operation of the keyboard 19. The price information will of course normally contain one or more fixed elements, in the form of symbols identifying at least the major unit of the currency in which the price is expressed. Such additional information can comprise further variable or selected information present by the user by means of the keyboard 19 or by other means less readily accessible than the keyboard, for example the machine can be provided with an input means 23 not normally available to the operator which can be reached or rendered operative only by opening the housing 1 or by use of a key. Alternatively or in addition fixed information to be printed may be determined on manufacture of the machine.

The fixed or invariable additional information can comprise for example the name of the vendor or a sales slogan. The additional variable or preset information can include for example unit price data, information as to the nature of the article (for example, its weight or volume or the number of items packed within it), and calendar information (for example, the date of packaging, the date by which the article should be sold or used, or the date by which a warranty on the article expires).

In addition, the label can be printed with alpha numeric data identifying the article in some suitable code, for stock control purposes. The label may also be printed with data relating to the article coded in a bar code, for reading electrically or optically, as at a check-out counter, the information being fed into a automatic cash register and/or into a computer for stock control purposes.

MULTILINE PRINTING

It will be evident that the additional information will normally require to be printed on more than one line, and the illustrated machine can be readily modified for multiline printing, on labels of sufficient length, by arranging for the multiprocessor 21 to advance the strip 5 through a series of steps each corresponding to a printed line, the length of only the last advance being covered by a signal from the sensor 8.

COLOUR PRINTING

The labelling machine of the invention and the label strip it uses can also be readily modified to obtain a label printed in two colours. In the modification, the single dye coating 29 of the surface of the label strip 28 is replaced by three layers of coating material. The heating elements of the printing head 6 are arranged to be heated selectively either to a higher or to a lower temperature. If a heating element receives current such that it is heated only to the lower temperature, the heat transferred to the label strip is sufficient to develop the colour of the outermost layer only. If the current supplied is sufficient to raise the temperature to the higher level, not only is the colour in the outer layer developed, but so is the colour in the innermost layer. The intermediate layer is also responsive to this level of temperature to permit flow of the activated dye from innermost to the outermost layer, so that a second colour different from that of the outermost layer on its own appears at the coated surface of the strip.

The microprocessor 21 can be readily adapted to effect printing of a label with a plurality of lines of information in different colours, or even to print in different colours on a single line.

SUMMATION AND DISPLAY

The circuit illustrated in FIG. 2 can if required include additional data register means 34 as shown, for totalling the number of labels printed with a particular item of selected data. The additional data register 34 may have the capacity for accumulating a plurality of totals each representing the number of times for which the machine has been used to print labels bearing respective different items of information.

Information thus stored can be displayed at command on the machine by means of a digital display 35 provided on the keyboard for stock control and/or accounting purposes, and/or conveyed from the machine to a computer interface by means of a suitable plug and socket connection 36, for the stored data to be used in a computerised stock control and accounting system. The digital display on the machine can be constituted by liquid crystal or light emitting diodes, or a gas discharge display.

Although the invention has been described with particular reference to a hand-held machine by which self adhesive labels can be applied manually to an article, the machine can instead be incorporated in a check weigher, the price information printed on the label being derived from the measured weight of a package, and the known price per unit weight, as calculated by the check weigher.

Although the label material is advantageously made self adhesive, in this way so that it can be attached by the adhesive to the article to be price labelled, it is also within the invention to provide labelling material which can be subsequently attached to an article by means of a thread or string or metal or plastics staple.

I claim:

1. A hand-held labeling machine, comprising: a housing having a manually engageable handle, the housing having means for holding a label supply roll composed of a composite web having labels releasably adhered to a backing strip, the housing further having means for holding a source of electrical energy, means including a keyboard mounted on the housing for entering selected data to be printed, means including an electrically selectable printing head powered by the source of electrical energy for printing on a label at a printing position, means for peeling a printed label from the backing strip, label applying means disposed adjacent the peeling means, means for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the electrically selectable printing head, and means for causing the data receiving and processing means to operate the printing head to print the selected data on the label.

2. A hand-held labeling machine as defined in claim 1, wherein the electrically selectable printing head includes a plurality of printing elements coupled to the data receiving and processing means.

3. A hand-held labeling machine as defined in claim 1, wherein the electrically selectable printing head includes a plurality of printing elements, and line driver circuit elements and dot driver circuit elements coupling the data receiving and processing means and the printing elements.

4. A hand-held labeling machine as defined in claim 2, wherein the data receiving and processing means includes a microprocessor.

5. A hand-held labeling machine, comprising: a housing having a manually engageable handle, the housing having means for holding a label supply roll composed of a composite web having labels releasably adhered to a backing strip, the housing further having means for holding a source of electrical energy, means including a keyboard mounted on the housing for entering selected data to be printed, means including an electrically selectable printing head powered by the source of electrical energy for printing on a label at a printing position, means for peeling a printed label from the backing strip, label applying means disposed adjacent the peeling means, means including a stepping motor for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the electrically selectable printing head, and means for causing the data receiving and processing means to operate the printing head to print the selected data on the label.

6. A hand-held labeling machine as defined in claim 5, wherein the feeding means includes means for sensing the position of the composite web, and means responsive to the sensing means for controlling the data receiving and processing means to terminate operation of the stepping motor when a label is in label applying relationship with respect to the label applying means.

7. A hand-held labeling machine as defined in claim 6, wherein the composite web has means adapted to be sensed by the sensing means.

8. A hand-held labeling machine as defined in claim 5, wherein the electrically selectable printing head includes a plurality of printing elements coupled to the data receiving and processing means.

9. A hand-held labeling machine as defined in claim 5, wherein the electrically selectable printing head includes a plurality of printing elements, and line driver circuit elements and dot driver circuit elements coupling the data receiving and processing means and the printing elements.

10. A hand-held labeling machine as defined in any one of claims 1, 5 or 6, wherein the data receiving and processing means includes a microprocessor.

11. A hand-held labeling machine as defined in claim 10, wherein the microprocessor includes a random access memory.

12. A hand-held labeling machine as defined in claim 10, wherein the microprocessor includes a read only memory.

13. A hand-held labelling machine as defined in claim 12, wherein the microprocessor includes a random access memory.

14. A hand-held labeling machine, comprising: a housing having a manually engageable handle, the housing having means for holding a label supply roll composed of a composite web having labels releasably adhered to a backing strip, the housing further having means for holding a source of electrical energy, means including a keyboard mounted on the housing for entering selected data to be printed, means including an electrically selectable printing head powered by the source of electrical energy for printing on a label at a printing position, means for peeling a printed label from the backing strip, label applying means disposed adjacent the peeling means, means for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the electrically selectable printing head, means including display means coupled to the data receiving and processing means for displaying data entered by the keyboard, and means including switch means for causing the data receiving and processing means to operate the printing head to print the selected data on the label.

15. A hand-held labeling machine as defined in claim 14, wherein the electrically selectable printing head includes a plurality of printing elements coupled to the data receiving and processing means.

16. A hand-held labeling machine as defined in claim 14, wherein the electrically selectable printing head includes a plurality of printing elements, and line driver circuit elements and dot driver circuit elements coupling the data receiving and processing means and the printing elements.

17. A hand-held labeling machine, comprising: a housing having a manually engageable handle, the housing having means for holding a label supply roll composed of a composite web having thermographic labels releasably adhered to a backing strip, the housing further having means for holding a source of electrical energy, means including a keyboard mounted on the housing for entering selected data to be printed, means including a thermographic printing head powered by the source of electrical energy for printing on a label at a printing position, means for peeling a printed label from the backing strip, label applying means disposed adjacent the peeling means, means for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the thermographic printing head, and means for causing the data receiving and processing means to operate the thermographic printing head to print the selected data on the label.

18. A hand-held labeling machine as defined in claim 17, wherein the data receiving and processing means includes a microprocessor.

19. A hand-held labeling machine, comprising: a housing having a manually engageable handle, the housing having means for holding a label supply roll composed of a composite web having thermographic labels releasably adhered to a backing strip, the housing further having means for holding a source of electrical energy, means including a keyboard mounted on the housing for entering selected data to be printed, means including a thermographic printing head powered by the source of electrical energy for printing on a label at a printing position, means for peeling a printed label from the backing strip, label applying means disposed adjacent the peeling means, means for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the thermographic printing head, means including display means coupled to the data receiving and processing means for displaying data entered by the keyboard, and means including switch means for causing the data receiving and processing means to operate the thermographic printing head to print the selected data on the label.

20. A hand-held labeling machine as defined in either claim 17 or 19, wherein the thermographic print head includes a plurality of printing elements electrically coupled to the data receiving and processing means.

21. A hand-held labeling machine, comprising: a housing having a manually engageable handle, the housing having means for holding a label supply roll composed of a composite web having thermographic labels releasably adhered to a backing strip, the housing further having means for holding a source of electrical energy, means including a keyboard mounted on the housing for entering selected data to be printed, means including a thermographic printing head powered by the source of electrical energy for printing on a label at a printing position, means for peeling a printed label from the backing strip, label applying means disposed adjacent the peeling means, means including a stepping motor for advancing the backing strip to peel a printed label from the backing strip at the peeling means and advance the printed label into label applying relationship with the label applying means and to advance another label to the printing position, means coupled to the keyboard for receiving and electrically processing data representative of the selected data entered by the keyboard, means electrically coupling the data receiving and processing means and the thermographic printing head, and means for causing the data receiving and processing means to operate the thermographic printing head to print the selected data on the label.

22. A hand-held labeling machine as defined in claim 21, wherein the feeding means includes means for sensing the position of the composite web, and means responsive to the sensing means for controlling the data receiving and processing means to terminate operation of the stepping motor when a label is in label applying relationship with respect to the label applying means.

23. A hand-held labeling machine as defined in claim 21, wherein the data receiving and processing means includes a microprocessor.

24. A hand-held labeling machine, comprising: a housing having a manually engageable handle, the housing having means for holding a label supply roll composed of a composite web having thermographic labels releasably adhered to a backing strip, the housing further having means for holding a source of electrical energy, means including a keyboard mounted on the housing for entering selected data to be printed, means including a thermographic printing head powered by the source of electrical energy for printing on a label at a printing position, means for peeling a printed label from the backing strip, label applying means disposed adjacent the peeling means, means for advancing the backing strip to peel a printed label from the backing strip at the peeling means and advance the printed label into label applying relationship with the label applying means and to advance another label to the printing position, means including a microprocessor coupled to the keyboard for receiving and electrically processing data representative of the selected data entered by the keyboard, means electrically coupling the data receiving and processing means and the thermographic printing head, means including switch means for causing the data receiving and processing means to operate the thermographic printing head to print the selected data on the label and to operate the feeding means, and means coupled to the microprocessor for terminating operation of the feeding means when a printed label has been advanced into label applying relationship relative to the label.

* * * * *